(12) United States Patent
Wallace

(10) Patent No.: US 9,182,508 B2
(45) Date of Patent: Nov. 10, 2015

(54) NEUTRON DETECTOR USING NEUTRON ABSORBING SCINTILLATING PARTICULATES IN PLASTIC

(76) Inventor: Steven Wallace, Knoxville, TN (US)

( * ) Notice: Subject to any disclaimer, the term of this patent is extended or adjusted under 35 U.S.C. 154(b) by 1406 days.

(21) Appl. No.: 12/551,554

(22) Filed: Aug. 31, 2009

(65) Prior Publication Data
US 2010/0019160 A1   Jan. 28, 2010

Related U.S. Application Data

(63) Continuation of application No. 10/861,926, filed on Jun. 4, 2004, now abandoned.

(60) Provisional application No. 60/476,001, filed on Jun. 5, 2003.

(51) Int. Cl.
G01T 3/00 (2006.01)
G01T 3/06 (2006.01)

(52) U.S. Cl.
CPC .................................. G01T 3/06 (2013.01)

(58) Field of Classification Search
USPC ........................................ 376/153, 154, 155
See application file for complete search history.

(56) References Cited

U.S. PATENT DOCUMENTS

| | | |
|---|---|---|
| 3,222,521 A | 12/1965 | Einfeld |
| 4,365,159 A | 12/1982 | Young |
| 4,481,421 A | 11/1984 | Young et al. |
| 4,641,028 A | 2/1987 | Taylor et al. |
| 4,958,080 A | 9/1990 | Melcher |
| 5,002,721 A | 3/1991 | Bernard et al. |
| 5,216,249 A | 6/1993 | Jones et al. |
| 5,289,510 A | 2/1994 | Mihalczo |
| 5,334,840 A | 8/1994 | Newacheck et al. |
| 5,336,889 A | 8/1994 | Hofstetter |
| 5,345,084 A | 9/1994 | Byrd |
| 5,532,482 A | 7/1996 | Stephenson |
| 5,656,815 A | 8/1997 | Justus et al. |
| 5,659,177 A | 8/1997 | Schulte et al. |
| 5,680,423 A | 10/1997 | Perkins et al. |
| 5,726,453 A | 3/1998 | Lott et al. |
| 5,880,471 A | 3/1999 | Schelton et al. |
| 5,968,425 A | 10/1999 | Bross et al. |
| 5,973,328 A | 10/1999 | Hiller et al. |
| 6,134,289 A | 10/2000 | Peurrung et al. |
| 6,218,670 B1 * | 4/2001 | Yun et al. ................. 250/370.11 |
| 6,471,888 B1 | 10/2002 | Mihalczo et al. |
| 6,876,711 B2 | 4/2005 | Wallace et al. |

(Continued)

OTHER PUBLICATIONS

C. M. Logan et al., "Observed Penetration of 14-MeV Neutrons in Various Materials," Nucl. Sci. Eng. 115, 38-42 (1993).

(Continued)

*Primary Examiner* — Jack W Keith
*Assistant Examiner* — Marshall O'Connor
(74) *Attorney, Agent, or Firm* — Pitts & Lake, P.C.

(57) ABSTRACT

A neutron detector composed of a matrix of scintillating particles imbedded in a lithiated glass is disclosed. The neutron detector detects the neutrons by absorbing the neutron in the $^6$Li isotope which has been enriched from the natural isotopic ratio to a commercial ninety five percent. The utility of the detector is optimized by suitably selecting scintillating particle sizes in the range of the alpha and the triton. Nominal particle sizes are in the range of five to twenty five microns depending upon the specific scintillating particle selected.

17 Claims, 7 Drawing Sheets

(56) References Cited

U.S. PATENT DOCUMENTS

| | | |
|---|---|---|
| 2003/0178574 A1 | 9/2003 | Wallace et al. |
| 2004/0104500 A1* | 6/2004 | Bross et al. .................... 264/85 |
| 2009/0140158 A1 | 6/2009 | Clothier et al. |

OTHER PUBLICATIONS

H. Jaeger et al., "Two-Detector Coincidence Routing Circuit for Personal Computer-Based Multichannel Analyzer," Rev. Sci. Instrum. 66, 3069-70 (1995).

E. J. T. Burns et al., "A Solenoidal and Monocusp Ion Source (SAMIS)," Rev. Sci. Instr., 67, 1657-60 (1996).

S. T. Coyle et al., "A Low Cost Preamplifier for Fast Pulses from Microchannel Plates," Rev. Sci. Instr., 66 4000-01 (1995).

Y. G. Kudenko et al., "Extruded Plastic Counters with WLS Fiber Readout," Nucl. Inst. and Meth. A 469, 340-346 (2001).

C1207-97 Standard Test Method for Nondestructive Assay of Plutonium in Scrap and Waste by Passive Neutron Coincidence Counting, ASTM International.

J. Y. Choe et al., "Cathodluminescence Study of Novel Sol-Gel Derived Y3—xAl5O12:Tbx Phosphors," Journal of Luminescence 93 (2001) 119-128.

R. Hogle et al., "APNEA List Mode Data Acquisition and Real-Time Event Processing," 5th Nondestructive Assay and Nondestructive Examination Waste Characterization.Conference, Jan. 14-16, Salt Lake City, UT, 1997.

B. D. :Ebedev et al., "Monte Carlo Calculation to Optimize the Neutron Multiplicity Counter for Measurement of Representative Plutonium Items in AT 400 Container," Proceedings of the INMM 43rd Annual Meeting, 2002.

S. Croft et al., "Principles of Fast Neutron Detector Package Design for Differential Dieaway Technique Assay," Proceeding of the INMM 43rd Annual Meeting, 2009.

http:www-numi-fnal.gov/minwork/info/minos_tdr.html, Chapter 5, Scintillator Detector Fabrication Detailing the MINOS Scintillator System.

Phillip Rinard, "Calculating Shuffler Count Rates," LA-13815-MS, Aug. 2001.

Greg Becker et al., "Transuranic and Low-Level Boxed Waste Form Nondestructive Assay Technology Overview and Assessment," INEEL/EXT-99-00121, Feb. 1999.

M. Bliss et al., "Real-Time Dosimetry for Boron Neutron-Capture Therapy," IEEE Trans. Nucl. Sci., vol. 42, No. 4, 639-43 (1995).

M. Ghioni et al., "Compact Active Quenching Circuit for Fast Photon Counting with Avalanche Photodiodes," Rev. Sci. Instr., 67, 3440-48 (1996).

Sheng Dai et al., "Spectroscopic Investigation of the Photochemistry of Uranyl-Doped Sol-Gel Glasses Immersed in Ethanol," Inorg. Chem., 35, 7786-90 (1996).

A. P. Bartko et al., "Observation of Dipolar Emission Patterns from Isolated Eu3+:Y2O3 Doped Nanocrystals: New Evidence for Single Ion Luminescence," Chemical Physics Letters 358 (2000) 459-465.

Mori et al., "Measurement of Neutron and y-ray Intensity Distributions with an Optical Fiber-Scintillator Detector," Nuclear Instruments and Methods in Physics Research, A 422, 129-132 (1999).

Gorin et al., "Development of Scintillation Imaging Device for Cold Neutrons," Nuclear Instruments and Methods in Physics Research, A479, 456-460 (2002).

Wallace et al., "Neutron Detector Based on Lithiated Sol-Gel Glass," Nuclear Instruments and Methods A 483 (2002) 764-773.

H. Krinninger et al., "Pulsed Neutron Method for Non-Destructive and Simultaneous Determination of the 235U and 239Pu Contents of Irradiated and Non-Irradiated Reactor Fuel Elements," Nucl. Instr. Meth. 73, 13-33 (1969).

Yun Chang Kang et al., "Y2SiO5:Ce Phosphor Particles 0.5-1.4 micrometer in Size with Spherical Morphology," J. Solid State Chem., 146 (1999) 168-175.

* cited by examiner

NEUTRON DETECTOR USING NEUTRON ABSORBING SCINTILLATING PARTICULATES IN PLASTIC

CROSS-REFERENCE TO RELATED APPLICATIONS

This application is a continuation of U.S. application Ser. No. 10/861,926, filed Jun. 4, 2004, which claims the benefit of U.S. Provisional Application No. 60/476,001, filed Jun. 5, 2003.

STATEMENT REGARDING FEDERALLY-SPONSORED RESEARCH OR DEVELOPMENT

Not applicable

BACKGROUND OF THE INVENTION

1. Field of Invention

The field of invention is neutron detectors. More particularly, the present invention relates to a neutron detector having solid absorbers.

2. Description of the Related Art

Neutron detectors are useful in many applications. One such application is the monitoring of fissile material in storage containers, in spent nuclear fuel and in waste. Limiting the unauthorized transfer of fissile material is endorsed by all countries participating in the International Atomic Energy Agency (IAEA) program. The purpose of the IAEA program is to limit access to those materials needed for constructing a nuclear weapon of mass destruction.

A major effort is being made to provide robust neutron detection instrumentation systems at all locations where fissile material from spent nuclear fuel and excess plutonium from obsolete nuclear weapons are stored. Quantitative measurements are required for nuclear accountability of the fissile mass placed in criticality-safe storage containers. The $^{240}$Pu isotope is present in these materials and is a spontaneous emitter of about 1000 neutrons/second/gram of the isotope. Fissile material emits high energy gamma radiation and this, combined with the measurement of neutrons, allows real-time monitoring of the stored material.

Fissile material containing $^{235}$U and $^{239}$Pu can be detected by the measurement of excess neutrons when materials containing these isotopes are subjected to an external source of neutrons. The measurement techniques include the differential die-away technique, the Californium shuffler and the AmLi add-a-source. Typical of the art are those techniques described by Phillip Rinard, "Calculating Shuffler Count Rates," LA-13815-MS, August 2001 and Greg Becker et al., "Transuranic and Low-Level Boxed Waste Form Nondestructive Assay Technology Overview and Assessment," INEEL/EXT-99-00121, February 1999. Each technique is principally developed by the Los Alamos National Laboratory.

Another industry in which neutron detectors are widely used is the oil industry, in which neutron detectors are used to detect potential oil yielding sites. Oil producing formations deep in the earth emit neutrons at a different rate than water bearing formations or non-fluid bearing rock. A device using neutron detection for logging oil wells is disclosed in U.S. Pat. No. 4,641,028 issued to Taylor et al., on Feb. 3, 1987.

The '028 patent teaches a well logging instrument for use in a cased well bore. The '028 device contains a sealed source of fast neutrons and two identical thermal neutron detectors with a volume of four atmospheres of $^3$He gas. The formation surrounding the cased well bore is bombarded with high energy neutrons and the two thermal neutron detectors are spaced apart from one another and from the source to receive slowed down or thermal neutrons from the surrounding formations. The epithermal or fast neutrons striking the formation are slowed down by fluids containing great quantities of hydrogen or chlorine atoms, creating thermal or slow neutrons, which the detectors respond to logarithmically and independently. The counting rate of each detector is processed independently to count rate meters and to a recorder to present two outputs of information. The presence or absence of hydrogen and chlorine atoms in the formations is detected by each detector.

U.S. Pat. No. 5,532,482 issued to Stephenson on Jul. 2, 1996, teaches a method for determining a characteristic of an underground formation. The '482 method includes the steps of irradiating the formation with high-energy neutrons and detecting neutrons scattered by the formation. The detected neutrons have energies above epithermal to determine the nature of the formation matrix. Stephenson teaches that epithermal neutrons can also be detected to determine formation porosity. Stephenson utilizes an apparatus having a high-energy neutron source, typically a D-T accelerator producing 14 MeV neutrons, and detectors such as $^4$He-filled proportional counters for detecting neutrons having energies above epithermal and $^3$He-filled proportional counters for detecting epithermal neutrons.

In addition to the oil industry, neutron detectors are also commonly used in the medical industry. Neutron detectors are also useful for surveillance in nuclear facilities and weapons storage. While several specific utilities of neutron detectors are mentioned, it is well known to those skilled in the neutron detection art that neutron detectors are useful in many applications.

Neutrons are uncharged particles that can travel through matter without ionizing the matter. Because neutrons travel through matter in such a manner, they are difficult to detect directly. Some other evidence of a neutron event must be detected in order to determine its existence. An indirect method detects the result of a neutron event and not the neutron event itself.

The use of indirect detection of neutrons is known in the art. For example, a neutron detector as disclosed in U.S. Pat. No. 5,334,840 issued to Newacheck et al., on Aug. 2, 1994. The '840 neutron detector detects photons of light emitted by carbon infiltrated boron nitride in its hexagonal form when the compound is bombarded by neutrons. The amount of light detected correlates to the number of neutrons bombarding the boron nitride.

Another neutron detector commercially available utilizes $^3$He as the neutron absorber, such as in the '028 device described above. When bombarded by neutrons, $^3$He decomposes into H and H$_3$ having combined kinetic energies of 764 keV. The ionization of the gas electrons can be detected using conventional methods well known in the art and further described below. This type of neutron detector requires a long collection time for the resulting ionization, requiring integrating and differentiating time constants of between 1 and 5 microseconds for the best results.

Other gas mixtures are commercially available that have varying resolution or charge per pulse yields depending on the gases used.

Neutron detection for monitoring the dose of thermal neutrons given to patients receiving boron neutron-capture therapy has used $^6$Li and a cerium activator in a glass fiber. See M. Bliss et al., "Real-Time Dosimetry for Boron Neutron-Capture Therapy," IEEE Trans. Nucl. Sci., Vol. 42, No. 4, 639-43 (1995). Hiller et al., in U.S. Pat. No. 5,973,328, issued on Oct. 26, 1999, improve this technique by allowing a cerium-activated glass fiber to be coated with fissionable elements. A wet chemistry method of placing radioactive fissile elements into glass—which in the vitrified state does not pose a hazard—as described in the '328 patent using sol-gel based technology, is a significant benefit. M. Ghioni et al., "Compact Active Quenching Circuit for Fast Photon Counting with Avalanche Photodiodes," Rev. Sci. Instr., 67, 3440-48 (1996), describe an avalanche photodiode implementation for detecting neutron induced ionization and optical pulse detection.

The '328 device introduced sol-gel techniques unique in the art of neutron detection. Sol-gel chemistry was first discovered in the late 1800s. This area of chemistry received renewed interest when the process was found useful in producing monolithic inorganic gels at low temperatures that could be converted to glasses without a high temperature melting process. C. J. Brinker et al., "Sol-Gel Science: The Physics and Chemistry of Sol-Gel Processing" (Academic Press, Inc., New York 1990) provide a comprehensive explanation of sol-gel chemistry. Sheng Dai et al., "Spectroscopic Investigation of the Photochemistry of Uranyl-Doped Sol-Gel Glasses Immersed in Ethanol," Inorg. Chem., 35, 7786-90 (1996), provide further detail disclosing uranyl-doped sol-gel glasses.

Emissions detectors such as microchannel plates, channeltrons, and avalanche photodiodes (APDs) are in common use for detecting ultraviolet (UV) light and fissioned charged particles such as electrons or protons. Microchannel plates are commercially available and well known in the art. Typically a microchannel plate is formed from lead glass having a uniform porous structure of millions of tiny holes or microchannels. Each microchannel functions as a channel electron multiplier, relatively independent of adjacent channels. A thin metal electrode is vacuum-deposited on both the input and output surfaces to electrically connect channels in parallel. Microchannel plates can be assembled in stacked series to enhance gain and performance.

The microchannel plates serve to amplify emissions from fissionable material resulting from the bombardment of neutrons. The amplified signal is then detected and recorded. The signal frequency is proportional to the charged particle emissions, which are proportional to the amount of neutrons bombarding the fissionable material.

Typically due to the exotic materials and sensitivity of the equipment, the neutron detectors currently available are expensive and difficult to maintain. For example $^3$He is an extremely rare stable isotope and must be separated at considerable expense from the radioactive gas tritium. Furthermore, the use of a gas absorber results in a slower response time than a solid absorber as disclosed herein. The '328 device thus incorporates fissionable material into a sol-gel composition in combination with an emission detector.

Neutron scattering is a powerful tool for conducting scientific studies of the physical geometry of molecules important in biology and material science. Protein structure and the structure of superconductors are of immediate practical importance. The detection of the scattered neutrons is an area where advancements are necessary. Specifically of concern are the ability to locate the scattered neutrons and the ability to rapidly process the neutron signals as the detection rate becomes very rapid.

A major research facility using spallation constructed by the Department of Energy is the Spallation Neutron Source (SNS) facility in Oak Ridge, Tenn. Spallation is a nuclear reaction in which incident particles bombard an atomic nucleus to eject particles from the nucleus. The SNS is designed to have an output of pulsed neutrons that is the most intense in the world of its type. The SNS is provided with multiple experimental stations using pulsed neutrons. One such experimental station locates the neutrons diffracted from a target on an x-y plane. The time of the neutron absorption on the x-y plane surface is then referenced to a fiducial timing signal to an accuracy of within 100 nanoseconds of the absorption event.

Mori et al., "Measurement of Neutron and γ-ray Intensity Distributions with an Optical Fiber-Scintillator Detector," Nuclear Instruments and Methods in Physics Research, A 422, 129-132 (1999), describe a ZnS(Ag) scintillator with $^6$Li on the tip of an optical fiber for locating neutrons with a position resolution of 1 mm in a 10 minute interrogation and within a volume wherein the tip is extendable one meter. Gorin et al., "Development of Scintillation Imaging Device for Cold Neutrons," Nuclear Instruments and Methods in Physics Research, A 479, 456-460 (2002), have described using ZnS(Ag) and $^6$LiF coupled to wavelength-shifting fibers. Gorin et al., employ arrays of fibers in two planes rotated ninety degrees relative to each other such that an absorbed neutron is located in the plane to a resolution of 1 mm.

Wallace et al., Nuclear Instruments and Methods A 483 (2002) 764-773 report the gamma insensitivity of the thin film lithiated glass. This specificity of the lithiated glass for generating a signal in the presence of gamma radiation has application to the monitoring of spent nuclear fuel rods and for the determination of the fissile mass within remotely handled transuranic waste.

Other methods and devices have been developed for neutron detection. Typical of the art are those methods and devices disclosed in the following U.S. patents and patent applications:

| Patent No. | Inventor(s) | Issue Date |
| --- | --- | --- |
| 3,222,521 | K. Einfeld | Dec. 7, 1965 |
| 4,365,159 | C. A. Young | Dec. 21, 1982 |
| 4,481,421 | C. A. Young et al. | Nov. 6, 1984 |
| 5,289,510 | J. T. Mihalczo | Feb. 22, 1994 |
| 5,336,889 | K. J. Hofstetter | Aug. 9, 1994 |
| 5,345,084 | R. C. Byrd | Sept. 6, 1994 |
| 5,659,177 | R. L. Schulte et al. | Aug. 19, 1997 |
| 5,726,453 | R. G. Lott et al. | Mar. 10, 1998 |
| 5,880,471 | J. Schelton et al. | Mar. 9, 1999 |
| 5,968,425 | A. Bross et al. | Oct. 19, 1999 |
| 5,973,328 | J. M. Hiller et al. | Oct. 26, 1999 |
| 6,134,289 | A. J. Peurrung et al. | Oct. 17, 2000 |
| 6,218,670 | J. C. Yun et al. | Apr. 17, 2001 |

Of these patents, Einfeld ('521) teaches a method and apparatus for the non-destructive testing of a substance to determine the concentration of two or more fissionable isotopes in the substance. Einfeld teaches generation of first and second neutron spectrums, each having a unique mean energy. Determination of the number of fissions as a function of the neutron spectrum applied follows from the counting of the prompt and/or delayed neutrons produced by the fissions.

Young ('159) teaches a neutron detection apparatus including a selected number of flat surfaces of $^6$Li foil. A gas mixture is in contact with each of the flat surfaces for selectively reacting to charged particles emitted by or radiated from the lithium foil. A container is provided to seal the lithium foil and the gas mixture in a volume from which water vapor and atmospheric gases are excluded, the container having one or more walls capable of transmitting neutrons. Monitoring equipment in contact with the gas mixture detects reactions taking place in the gas mixture and, in response to such reactions, provides notice of the flux of neutrons passing through the volume of the detector.

Similarly, Young et al., ('421) teach a neutron detection apparatus is provided including a selected number of surfaces of $^6$Li coated wire mesh in contact with a gas mixture for selectively reacting to charged particles emitted or radiated by the $^6$Li coated mesh. As in the '159 device, a container is provided to seal the $^6$Li coated mesh and the gas mixture in a volume from which water vapor and atmospheric gases are excluded, the container having one or more walls capable of transmitting to neutrons. Monitoring equipment in contact with the gas mixture detects the generation of charged particles in the gas mixture and, in response to such charged particles, provides an indication of the flux of neutrons passing through the volume of the detector.

In the '510 patent, Mihalzco teaches nuclear reaction detectors capable of position sensitivity with sub-millimeter resolution in two dimensions. The nuclear reaction detectors include two arrays of scintillation or wavelength shifting optical fibers. Each array is formed of a plurality of optical fibers disposed in a side-by-side relationship. The two arrays are disposed in X- and Y-directions with respect to each other, with a layer of nuclear reactive material disposed between and operatively associated with surface regions of the optical fiber arrays. Each nuclear reaction occurring in the layer of nuclear reactive material produces energetic particles for simultaneously providing a light pulse in a single optical fiber in the X-oriented array and in a single optical fiber in the Y-oriented array. These pulses of light are transmitted to a signal producing circuit for providing signals indicative of the X-Y coordinates of each nuclear event.

The nuclear reactive material of the '510 patent is doped with a phosphor such as calcium tungstate, magnesium tungstate, zinc silicate, zinc sulfide, cadmium tungstate, and cadmium borate. Mihalzco further teaches that a compound such as $^6$LiF or glass or plastic scintillators containing $^{235}$U, $^{10}$B, or $^{238}$U provides a concentration of the phosphor dopant in the layer of nuclear reactive material sufficient to assure that an adequate distribution of phosphor to be contacted by and react with the energetic particle is produced from each nuclear reaction. Normally, a concentration of the phosphor dopant in the range of about 100 ppm to about 2 percent by volume is adequate for the purposes of the Mihalzco detectors.

Hofstetter ('889) discloses a gamma radiation detector using a radioluminescent composition. The detector includes a radioluminescent composition that emits light in a characteristic wavelength region when exposed to γ radiation. The composition contains a scintillant such as anglesite (PbSO$_4$) or cerussite (PbCO$_3$) incorporated into an inert, porous glass matrix via a sol-gel process. Particles of radiation-sensitive scintillant are added to a sol solution. The mixture is polymerized to form a gel, and then dried under conditions that preserve the structural integrity and radiation sensitivity of the scintillant. The final product is a composition containing the uniformly-dispersed scintillant in an inert, optically transparent and highly porous matrix. Hofstetter describes the resulting composition as chemically inert and substantially impervious to environmental conditions.

In the Byrd ('084) device, a plurality of omnidirectional radiation detectors is arranged in a closely packed symmetrical pattern to form a segmented detector. The output radiation counts from these detectors are arithmetically combined to provide the direction of a source of incident radiation. Output counts from paired detectors are subtracted to yield a vector direction toward the radiation source. The counts from all of the detectors are combined to yield an output signal functionally related to the radiation source strength.

R. L. Schulte et al., ('177) teach a directional thermal neutron detector for detecting thermal neutrons and determining the direction of the thermal neutron source. The directional detector includes an array of individual thermal neutron detector modules, each of which comprises front and back planar silicon detectors between which is disposed a gadolinium foil. The array comprises a plurality of individual detector modules angularly displaced with respect to each other. The direction of the thermal neutron source is determined by comparing the magnitudes of the output signals from the plurality of angularly displaced detector modules. Each thermal neutron detector module is segmented into four quadrants to reduce its capacitance and resultant noise. The thickness of the gadolinium foil in each thermal neutron detector module is at least 15 microns thick, to improve the front-to-back silicon detector counting ratio to ascertain the side (front or back) from which thermal neutrons are arriving at the detector. The thick gadolinium foil makes each detector module substantially opaque to thermal neutrons, and the detector modules are positioned relative to each other in the array to shield one another from thermal neutrons, thereby enhancing the angular resolution of the directional thermal neutron detector. Gamma rays are discriminated against by using coincidence signal processing within the elements of the detector sandwich to reduce the gamma ray contribution to the total signal.

Lott et al., ('453) disclose a radiation resistant solid state neutron detector. The '453 detector uses a neutron converter material such as boron or lithium to react with neutrons to create charged particles that are received in a semiconductor active region of the detector. The active thickness of the detector is smaller than the range of the charged particles. Since most of the radiation damage produced by impinging charged particles occurs near the end of the range of the particles, displacement damage predominantly occurs outside of the active region. Although the charged particles pass through the semiconductor material, the particles cause electron excitation within the semiconductor material, the electron excitation being detected in the form of an electronic pulse. The '453 detector is provided to increase resistance to radiation damage, improve high temperature operation, and to obtain real time measurements of neutron flux in reactor cavities and other previously inaccessible locations.

Schelton et al., ('471) disclose a neutron detector for the detection of thermal neutrons. The '471 neutron detector includes $^6$LiF layers for the conversion of the neutrons to ionizing radiation. The $^6$LiF layers are surrounded by layers for detecting the ionizing radiation generated by the neutrons in the $^6$LiF layers.

The '425 patent issued to Bross et al., discloses methods for the continuous production of the plastic scintillator material. The methods employ either two major steps (tumble-mix) or a single major step (inline-coloring or inline-doping). Using the two step method, the polymer pellets are mixed with silicone oil, and the mixture is then tumble mixed with the dopants necessary to yield the proper response from the scintillator material. The mixture is then placed in a compounder and compounded in an inert gas atmosphere. The resultant scintillator material is then extruded and pelletized or formed. When only a single step is employed, the polymer pellets and dopants are metered into an inline-coloring extruding system. The mixture is then processed under a inert gas atmosphere, usually argon or nitrogen, to form plastic scintillator material in the form of either scintillator pellets, for subsequent processing, or as material in the direct formation of the final scintillator shape or form Peurrung et al., ('289) teach a system for measuring a thermal neutron emission from a neutron source. The '289 device includes a reflector/moderator proximate the neutron source that reflects and moderates neutrons from the neutron source. The reflector/moderator further directs thermal neutrons toward an unmoderated thermal neutron detector.

U.S. Pat. No. 5,973,328 issued to J. M. Hiller et al., discloses a neutron detector composed of fissionable material having ions of lithium, uranium, thorium, plutonium, or neptunium, contained within a glass film fabricated using a sol-gel method combined with a particle detector. When the glass film is bombarded with neutrons, the fissionable material emits fission particles and electrons. The '328 patent further discloses prompt emitting activated elements yielding a high energy electron contained within a sol-gel glass film in combination with a particle detector. The emissions resulting from neutron bombardment can then be detected using standard UV and particle detection methods well known in the art, such as microchannel plates, channeltrons, and silicon avalanche photodiodes.

Currently pending U.S. Patent Application 2003/0178574 filed by the inventor of the present application, along with A. Stephan, S. Dai and H. J. Im, discloses a neutron detector composed of a matrix of scintillating particles imbedded in a lithiated glass. The neutron detector detects the neutrons by absorbing the neutron in the $^6$Li isotope which has been enriched from the natural isotopic ratio to a commercial ninety five percent. The utility of the '574 detector is optimized by suitably selecting scintillating particle sizes in the range of the alpha and the triton. Nominal particle sizes are in the range of five to twenty five microns depending upon the specific scintillating particle selected.

Other references of interest in the art of neutron detection include:

H. Krinninger et al., "Pulsed Neutron Method for Non-Destructive and Simultaneous Determination of the $^{235}$U and $^{239}$Pu Contents of Irradiated and Non-Irradiated Reactor Fuel Elements," Nucl. Instr. Meth. 73, 13-33 (1969);

M. Zanarini et al., "Evaluation of Hydrogen Content in Metallic Samples by Neutron Computed Tomography," IEEE Trans. Nucl. Sci., 42, 580-84 (1995);

C. M. Logan et al., "Observed Penetration of 14-MeV Neutrons in Various Materials," Nucl. Sci. Eng. 115, 38-42 (1993);

H. Jaeger et al., "Two-Detector Coincidence Routing Circuit for Personal Computer-Based Multichannel Analyzer," Rev. Sci. Instrum. 66, 3069-70 (1995);

E. J. T. Burns et al., "A Solenoidal and Monocusp Ion Source (SAMIS)," Rev. Sci. Instr., 67, 1657-60 (1996);

S. T. Coyle et al., "A Low Cost Preamplifier for Fast Pulses From Microchannel Plates," Rev. Sci. Instr., 66 4000-01 (1995);

Y. G. Kudenko et al., "Extruded Plastic Counters with WLS Fiber Readout," Nucl. Inst. And Meth. A 469, 340-346 (2001);

C1207-97 Standard Test Method for Nondestructive Assay of Plutonium in Scrap and Waste by Passive Neutron Coincidence Counting, ASTM International;

W. Harker et al., "Demonstration Neutron Multiplicity Counter Coincidence Counting Software for Authentication," Los Alamos National Laboratory Report LA-UR-01-4186, July 2001;

R. Hogle et al., "APNEA list mode data acquisition and real-time event processing," 5th Nondestructive Assay and Nondestructive Examination Waste Characterization Conference, January 1-16, Salt Lake City, Utah, 1997;

B. D. Lebedev et al., "Monte Carlo Calculation to Optimize the Neutron Multiplicity Counter for Measurement of Representative Plutonium Items in AT 400 Container," Proceedings of the INMM 43rd Annual Meeting, 2002;

S. Croft et al., "Principles of Fast Neutron Detector Package Design for Differential Dieaway Technique Assay," Proceeding of the INMM 43rd Annual Meeting, 2002;

Yun Chan Kang et al., "$Y_2SiO_5$:Ce Phosphor Particles 0.5-1.4 micrometer in Size with Spherical Morphology," J. Solid State Chem., 146 (1999) 168-175;

A. P. Bartkoetal et al., "Observation of dipolar emission patterns from isolated $Eu^{3+}:Y_2O_3$ doped nanocrystals: new evidence for single ion luminescence," Chemical Physics Letters 358 (2000) 459-465; and J. Y. Choe et al., "Cathodluminescence study of novel sol-gel derived $Y_{3-x}Al_5O_{12}$:Tbx phosphors," Journal of Luminescence 93 (2001) 119-128.

The trafficking in fissile material capable of being fabricated into a nuclear weapon of mass destruction is publicized to be so profitable that significant resources are being expended to prevent the diversion of material for clandestine sales. Iraq has been the focus of international attention because that government has actively sought to acquire fissile material. Other nations in the Mid East may want to clandestinely acquire fissile material so as to have the option of developing a nuclear weapon in the future. Such a clandestine hording of material would be virtually impossible to detect if placed in cold storage without the generation of new structures that would be detected by satellite surveillance. Neutron detectors offer the means to observe fissile material using active and passive measurement techniques.

Two attributes are necessarily measured in all systems used for the unambiguous identification of fissile material. These include gamma radiation and the active and passive techniques of measuring for the presence of neutrons.

The development of systems for measuring gamma rays starting at 59.5 keV associated with Americium and extending up to 414 keV for Plutonium is mature. The Los Alamos National Laboratory and the Lawrence Livermore National Laboratory have developed sodium iodide (NaI) and high purity germanium (HPGE) gamma ray detection systems that are field portable and operator friendly for measuring radiation in the desert. Large neutron detectors have not had as much effort expended in the development of field detectors. Improved technology exists to provide a solid-state neutron detector for field measurement of neutrons using aerial surveys. The same detector can be truck mounted allowing surveys having a standoff from the buildings being observed.

The most useful rapid means of surveying a large area for radiation is an aerial survey using a helicopter. A large volume neutron detector that can be towed below a helicopter allows a rapid survey to be conducted of any facility and the surrounding buildings without a need to place personnel with instruments at risk. However, large neutron detectors have not been developed for this application. The same detectors could be placed into trucks and any activity seen in the air can be confirmed by having surveys made around the perimeter of the hot buildings.

With reference again to the '328 patent, which discloses the means for producing a glass containing a high loading of $^6$Li, the glass is pipetted upon the surface of a silicon charged particle detector and the triton and alpha particles from neutron absorption enter the detector signaling the presence of neutrons. The enhancement on the technology takes the original technique of generating a lithiated glass using a sol-gel process and couples it with the manufacture of a composite material where micron size organic and inorganic scintillating particles are embedded within the glass. This method has been demonstrated. A further development of the technology is the placement of a thin 1 mm layer of this scintillating composite between two arrays of orthogonal wavelength shifting fibers. The basic 2-D imaging technique using a scintillation layer between wavelength shifting fibers is reported by Gorin, A., et al., Nuclear Instruments and Methods A 479, 456 (2002).

Using high speed coincidence circuitry based upon positron emission tomography the location of neutron absorption can be located on two of the fibers allowing a 1 mm resolution on a tile of one square meter. The scintillation output in the inorganic particles is roughly 100,000 photons. The spherical wave from the ionization trail in the particle couples to a fiber above and a fiber below the glass film and the x-y coordinate is recorded in a high speed data acquisition system. Additionally the time of the detection of a neutron is to be made to within 100 nanoseconds of a fiducial timing signal. Multiple detectors are to be tiles so that at about thirty square meters of detector area are monitored. The final product is a system to be used at the Spallation Neutron Source for making neutron diffraction measurements of cold neutrons.

Specific reference is made to the MINOS neutrino oscillation detector under construction at Fermi National Accelerator Laboratory. In particular, reference is made to http://www-numi.fnal.gov/minwork/info/minos_tdr.html, Chapter 5, Scintillator detector fabrication detailing the MINOS scintillator system. Sections 5.1 through 5.5 which is a detector which uses an extruded plastic scintillator read out by wavelength shifting (WLS) fibers coupled to multi-pixel photodetectors. The polystyrene used for the MINOS detector contains a fluor at a 175 ppm doping concentration.

Coincidence detection of neutrons can be automated into hardware as can be licensed from Los Alamos National Laboratory. In an alternate method, every neutron that is in every neutron detector in a plurality of detectors with respect to fiducial timing markers is recorded. Post-processing the millions of detected neutrons that are taken in making a fissile material mass measurement has been developed for field measurements of transuranic waste destined for the Waste Isolation Pilot Plant in Carlsbad, N. Mex. The entire list of events is sorted in a few minutes for tagging the spontaneous neutron events and by use of calibration standards giving the fissile waste mass in a fifty-five gallon waste drum. The same coincidence method is used for small one and five gallon containers used for storing enriched uranium oxide and plutonium oxide. These systems are based upon using $^3$He tubes containing the gas at a pressure of three or four atmospheres embedded in polyethylene walls surrounding the material being measured for fissile mass. The polyethylene is thermalizing the neutrons which then enter the $^3$He tubes. The tubes may be concentric layers up to three deep to achieve high capture efficiency. The present invention proposes to replace the polyethylene with polystyrene and the $^6$Li glass/scintillation particulates for the $^3$He tubes. A key figure that is a measure of the power of the system to design the dimensions of walls and the placement of the $^3$He tubes in such a way as to thermalize the neutrons and capture them in the shortest interval after their creation. The use of polystyrene as the matrix for placement of the $^6$Li glass/scintillating particulates allows great design flexibility in the selection of the density per cubic centimeter to minimize the time for thermalization and neutron capture for differing enclosed volumes.

BRIEF SUMMARY OF THE INVENTION

A method for manufacturing a neutron absorber/scintillating particle matrix is disclosed. The method of the present invention utilizes scintillating/lithiated glass composite particles having a light emission pulse width output that is nominally less that 100 nanoseconds full-width-half-maximum (FWHM). As a result, monitoring high count rates using a large volume efficient detector is accomplished. In the present method, $^6$Li glass/scintillating particulates are coupled as a dilute homogeneous distribution within an optically clear plastic matrix.

The present invention describes the means for manufacturing a neutron detector so that a large volume can be observed for the detection of absorbed neutrons. Neutron absorbing lithiated/scintillating particulates are uniformly distributed within a clear, optically-transparent plastic matrix. Scintillation emission is detected by either direct coupling of the optically-transparent plastic to a photomultiplier or via a wavelength shifting fiber coupled between the optically-transparent plastic block and a photomultiplier. Multiple blocks may each have a dedicated wavelength shifting fiber. In one embodiment, a plurality of fibers is coupled to the face of one multi-anode photomultiplier allowing for a lower cost monitoring system. The volume that can be made sensitive to this neutron detector design is very large. The present invention provides a means for interrogating large volumes of scintillation material for neutron absorption using a basic design as a building block that is replicated as required.

The invention has application to the quantitation of the fissile mass within a container using the neutron absorbing plastic in place of $^3$He tubes. A technology is commercialized that was developed over several years at the Los Alamos National Laboratory. The present invention offers an alternate means of detecting neutrons having the advantage that the cost of the neutron absorbing element is lower cost than the gas tubes and can be produced in large quantity by an extrusion process.

The building block element of the present invention is a rectangular block of polystyrene doped with a dilute density of lithiated/scintillator particulates. Polystyrene is a cost effective plastic, but other clear plastics such as polymethylmethacrylate are likewise useful. In particular, the present invention is based upon the hardware being fielded for the detection of neutrino oscillations and is further based upon the use of a pressure extruded polystyrene block with a thin over-coated layer of polystyrene containing titanium dioxide. The cross section of the extrusion is rectangular and has a groove running the length of the extruded bar. The extruded bar is cut to a five meters length and a wavelength shifting fiber is cemented in the groove and the fiber is extended beyond the groove to allow placement against the face of a multi-anode photomultiplier. A wavelength shifting fiber is placed in the groove and secured with an optically transparent epoxy. Whereas the MINOS polystyrene blocks contain a fluor in a concentration of 175 ppm, the present invention uses a fine dilute dispersion of neutron absorbing composite particles composed of lithiated glass/scintillating particles. The volumetric density of the particulates is selected so as to be designed to absorb a fraction of the neutrons entering the block. Such a designed density is engineered as to the percent absorption by the $^6$Li using the neutronic code MCNP5 or MCNPX, programs written at the Los Alamos National Laboratory.

A scintillation pulse occurs when an ionization path is created in the scintillating particle. This occurs when a neutron is absorbed in the proximate lithiated glass within the volume of the clear polystyrene. The scintillation pulse reflects internally from the titanium dioxide walls and impinges upon the wavelength shifting optical fiber located in the extruded groove. The optical fiber in turn guides a fraction of the scintillation light emission to a location on the face of the multi-anode photomultiplier.

The present invention advances the technology of detecting fissile material by utilizing the processing of the temporal detection of neutrons using timing circuitry used in Positron Emission Tomography (PET) scanners manufactured by CTI Molecular Imaging, Inc., Knoxville, Tenn. The use of analyzing the temporal distribution of the neutron detection moments is well known. The relative distribution of singles, doubles and triples within a window of time with respect to the occurrence of each neutron is used for the measurement of the mass of fissile plutonium. In particular, the $^{240}$Pu isotope spontaneously fissions, yielding about 1040 neutrons per second per gram of $^{240}$Pu. The fission process yields a mean number of neutrons greater than two, and the tabulated value is designated eta. In measuring the fissile content of a container of plutonium, waste neutrons are also present from alpha particles interacting with light nuclei with an emission of one neutron. Since spontaneous emission has an average of a nominal 2.5 to 2.8 neutrons created and since these neutrons are born simultaneously, the neutrons are highly correlated with respect to their temporal detection. The process that results in the absorption in the $^6$Li atom is one of a random walk. For example, if the spontaneous fission results in three neutrons being emitted and they possess kinetic energy of 900 keV, then the neutrons split off in different directions and are absorbed into the wall of an enclosure composed of blocks of polystyrene containing the $^6$Li. Polystyrene is a compound having a formula showing that the material is one half hydrogen and one half carbon. The neutrons bounce off the hydrogen and the carbon and momentum is exchanged so that with a few tens of energy exchanges, the neutrons move through the plastic as if a gas at the temperature of the plastic. A property of the $^6$Li is that as these neutrons lose energy so as to come into thermal equilibrium with the polystyrene, the cross-section for the capture by the $^6$Li atom becomes very high relative to the range of the neutrons. That is to say, thermal neutrons cannot penetrate through a $^6$Li wall thicker than a fraction of a millimeter without being captured. The dispersion of the $^6$Li in the polystyrene is quantified in milligrams per cubic centimeter and it is this density that is determined using the Monte Carlo codes to design a detector of dimensions so that thermalization and capture occur with a probability near one for the spontaneous neutrons. In this manner neutrons detected closely in time can be attributed as being of a common origin, i.e. from a spontaneous fission.

The present invention allows the direct measurement of the detection of neutrons that are so proximate in time as to be attributed with a high probability to a fission event. The present state-of-the-art for the measurement neutrons correlated in time uses $^3$He tubes to capture the neutrons arranged in concentric rings about interrogation volume. Extensive modeling is made for these systems as can be seen in the Proceedings of the INMM 43rd Annual Meeting, 2002, paper Monte Carlo Calculation to Optimize the Neutron Multiplicity Counter for Measurement of Representative Items in AT400 Container and paper Principles of Fast Neutron Detector Package Design for Differential Dieaway Technique Assay, see www.inmm.org. The present invention replaces the $^3$He tubes with the slabs of polyethylene containing the dilute uniform dispersion of lithiated glass/scintillation particles. Neutrons are also present in fissile material from an alpha particle impacting a light atomic number atom. A single neutron is emitted. An ASTM Standard Test Method describes the nondestructive assay of scrap or waste for plutonium content using passive thermal-neutron coincidence counting, C1207-97.

A neutron detector composed of a matrix of scintillating particles imbedded in a lithiated glass is disclosed. The lithiated glass is formed through one of several methods including, but not limited to: mixing scintillating particles into a high temperature liquid; mixing powdered lithium glass and scintillating particulates and melting the mixture to fuse the particulates in the glass; and polymerizing a mixture of scintillating particulates in a sol-gel lithiated glass precursor. The neutron detector is provided for detecting neutrons by absorbing the neutrons in a $^6$Li isotope enriched from its natural isotopic ratio to approximately ninety-five percent (95%). The utility of the detector is optimized by suitably selecting scintillating particle sizes in the range of the alpha and the triton. Nominal particle sizes are in the range of five to twenty-five (5-25) microns, depending upon the specific scintillating particle selected.

The neutron absorber/scintillating particle matrix utilizes scintillating particles having a scintillating pulse width output less than 100 nanoseconds. Coupling of the $^6$Li to the scintillating particulates is accomplished as a homogeneous distribution of the $^6$Li within a glass produced using sol-gel chemistry and into which scintillating particulates are embedded. The lithiated glass is useful for generating a signal in the presence of gamma radiation. The material is useful in manufacturing a neutron detector so that a large area is observable for detecting neutrons at a relatively high resolution.

The neutron detecting material is fabricated from a scintillating material and a matrix material. The matrix material is provided to fill spaces between particles of the scintillating material. The matrix material is a glass having a volumetrically high loading of a neutron absorbing material.

As a neutron is absorbed in the matrix material, ions having a high kinetic energy are created. The ions then transverse from the matrix material into the scintillating material, creating an ionized path. As a result of the ionization path within the scintillating material, a scintillation output is generated. Upon relaxation of the ions into a non-ionized state, photons are yielded. The photons are of a wavelength and duration characteristic of the scintillator material.

A layer of material defines first and second opposing surfaces. A light reflecting layer is coated on the first surface of the material. The light reflecting layer is provided for reflecting photons back into the material to be transmitted through the second surface to then be detected. A detector is provided for detecting the photons. The detector is disposed proximate the material layer second surface. A scintillating layer is selectively positioned between the material layer and the detector.

In an alternate employment of the material of the present invention, the second surface of a layer of the neutron detecting material is disposed on a quartz disk to form a rigid surface. Optics composed of at least one lens are placed between the material and the detector. The optics also include at least one turning mirror as required. The optics are optimized to focus an image on the receptor surface of the detector. In this configuration, an incident beam of neutrons is passed through a sample and toward the material. Scintillation pulses from an incident beam of neutrons passing through a sample are directed through the optics toward the detector.

In a further embodiment utilizing a layer of the neutron detecting material, a reflective layer such as chrome is disposed on the first surface of the material layer. A scintillating layer such as yttrium aluminum garnet is disposed on the second surface of the material layer. A detector is disposed proximate the scintillating layer as described in either of the prior embodiments, or other conventional detector arrangements.

In one such conventional detector arrangement, two planar arrays of fibers are provided. The two fiber arrays are disposed orthogonally with respect to each other, with a first array disposed in a local x-direction, and a second array disposed in a local y-direction. A plurality of PMTs is associated with each array of fibers for receiving optical pulses from the individual fibers. A neutron detecting material layer is disposed between the proximal ends of each layer of fibers. Scintillation activity generated by the detection of neutrons in the material is detected by a fiber in each array. The location of the scintillation activity is determined to be the coordinates of the fiber in the first array and the fiber of the second array.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A neutron detector composed of a matrix of scintillating particles imbedded in plastic is disclosed. The present invention provides a means for manufacturing a neutron absorber/scintillating particle matrix utilizing scintillating particles having emission properties superior to ZnS(Ag). Specific applications of the material of the present invention include, but are not limited to, monitoring spent nuclear fuel rods and determining fissile mass within remote handle transuranic waste. The material of the present invention is also useful in manufacturing a neutron detector so that a large area is observable for detecting neutrons at a relatively high resolution. For instance, in one application, a resolution of approximately 1 mm is accomplished. The material of the present invention is capable of being replicated in order to provide a relatively large area (square meters) sensitive to neutrons.

The present invention is an extension of the technology disclosed in the above-referenced '328 patent issued to Hiller et al., and incorporated herein by reference, with which there is at least one common inventor to the present invention. As a point of reference for description of the present invention, the '328 patent teaches a neutron detector composed of fissionable material contained within a glass film and combined with a particle detector. The fissionable material incorporates ions of an element selected from the group consisting of lithium, uranium, thorium, plutonium, and neptunium. The neutron detector of the '328 patent is fabricated using a sol-gel method. When the glass film is bombarded with neutrons, the fissionable material emits fission particles and electrons. Hiller et al., further disclose the prompt emission of activated elements yielding a high-energy electron contained within a sol-gel glass film in combination with a particle detector. The emissions resulting from neutron bombardment are then detected using standard optical and particle detection methods well known in the art, such as with microchannel plates, photomultiplier tubes, and silicon avalanche photodiodes.

The neutron detecting material of the present invention is illustrated schematically at 10 in the Figures. The neutron detecting material, or material 10, is fabricated from a scintillating material 12 and a matrix material 14. The matrix material 14 is provided to fill spaces between particles of the scintillating material 12. In the present practical demonstration of the invention the preferred neutron absorbing element is $^6Li$. The scintillating material 12 is in the present case demonstrated using yttrium silicate and yttrium aluminum garnet.

Figure 1:
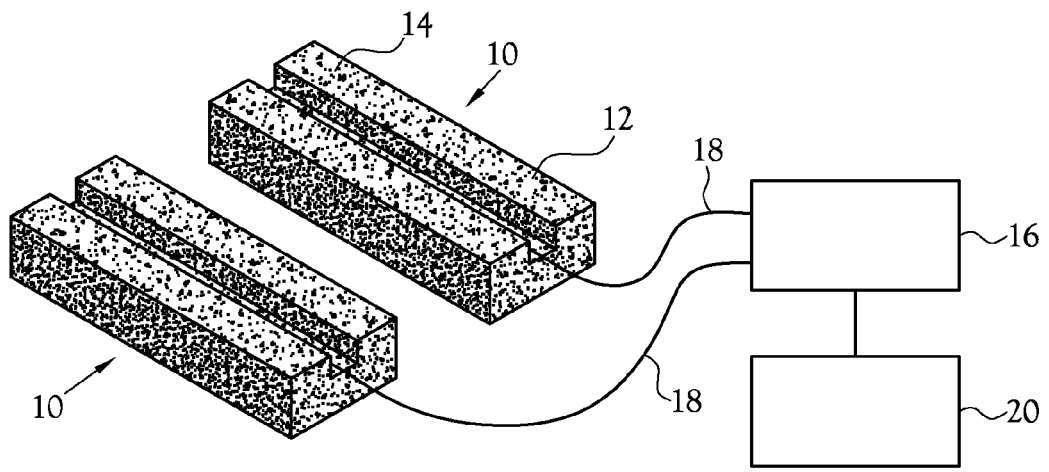
FIG. 1 is a perspective illustration of a plastic neutron absorbing element of the present invention. Preferably polystyrene containing the lithiated glass/scintillating particles manufactured by an extrusion process.
Figure 2:
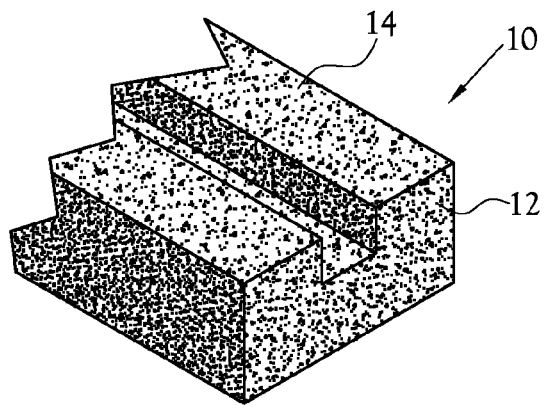
FIG. 2 is a perspective illustration of an enlarged portion of the transparent plastic with the lithiated glass/scintillating particulates dispersed therein.
Figure 3:
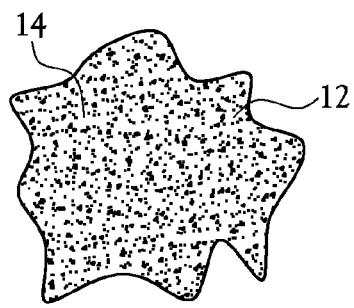
FIG. 3 illustrates a particulate of a nominal twenty micron diameter made up of an aggregate of smaller scintillating particles within a lithiated glass matrix. is an elevation view of the neutron detecting material of the present invention showing the neutron detecting composite structure and one preferred means of coupling to light detecting and processing elements.

In the illustrated embodiment in FIG. 1, the neutron detecting material 10 is formed into slabs such as through an extrusion process. Each slab of material 10 is optically connected to a detecting element 16 such as via the illustrated wavelength shifting fibers 18. Data from the detecting element 16 is delivered to a processor 20 for storage, processing and output. In the illustrated embodiment, two slabs of material 10 are shown in optical communication with a single detecting element 16. However, it will be understood that more or fewer than two may be optically connected, with limits only based on the characteristics of the selected detecting element 16. Typical light detecting elements 16 include photomultiplier tubes, multi-anode photomultipliers, silicon photodiodes, microchannel plates, and avalanche photodiodes.

Figure 13:
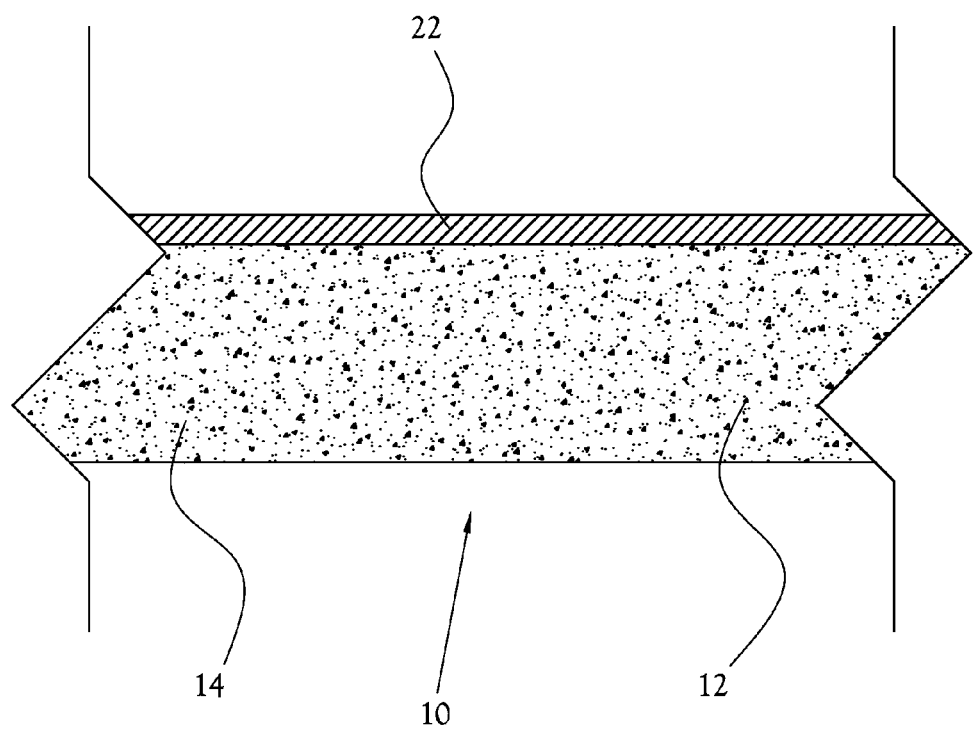
FIG. 13 is a section view illustration of a plastic neutron absorbing element of the present invention.

As a neutron is absorbed in the matrix material 14, ions having a high kinetic energy are created. The ions then transverse from the matrix material 14 into the scintillating material 12, creating an ionized path. As a result of the ionization path within the scintillating material 12, a scintillation output is generated. Upon relaxation of the ions into a non-ionized state, photons are yielded. The photons are of a wavelength and duration characteristic of the scintillator material 12. As shown in the section view in FIG. 13, in some embodiments, the neutron detecting material 10 includes a surface coating 22 disposed on the plastic 14 for reflecting the scintillations within the plastic 14 to an output of the neutron detector.

Although not illustrated, the neutron detecting material 10 of the present invention is also useful in a detector arrangement similar to that disclosed by Byrd in the aforementioned U.S. Pat. No. 5,345,084. In such an arrangement, an array of neutron detectors of the present invention is used for providing the direction of a neutron source. The array is augmented with boron loaded polyethylene collimation to enhance discrimination with respect to determining the direction of the source of neutrons. Such arrangement is useful, for example, for locating a mass of plutonium within a drum, and for measuring the curium concentration along the length of a spent nuclear fuel rod.

Various matrix materials 14 have been used to fabricate the neutron detecting material 10 of the present invention. Several scintillation materials have been tested in lithiated sol-gel for light pulse output in a gamma free port at the Intense Pulsed Neutron Source located at the Argonne National Laboratory. Scintillation materials used for testing include: polystyrene doped with PPO (2,5-diphenyloxazole) as a primary flour and POPOP (1,4-bis(5-phenyloxazol-2-yl)benzene) as a secondary flour; $Lu_2SiO_5$:Ce; $Y_2SiO_5$:Ce; ZnO:Ga; $Y_3Al_5O_{12}$:Ce; $CaSiO_3$:Mn,Pb; $La_2O_2S$:Eu; BC-400 and CaS:Ce. Each scintillation material was individually mixed with a lithiated sol-gel, the sol-gel then being placed upon a 3.8 cm quartz disk of a nominal one (1) mm thickness. The disk was coupled to a PMT using a commercial optical couplant available from St. Gorbain. $Y_2O_3$:Eu was evaluated using a Cf-252 source. The neutron detecting material 10 of the present invention was disposed on a quartz disk which was coupled to the face of a Hamamatsu R580 PMT. Neutrons scattered out of the beam line into the neutron detecting material 10 generated scintillation pulses upon absorption by the $^6Li$ and the ionization in the scintillation particulates from the stopping of the triton and alpha particle. A LeCroy LT344 500 MHz digitizing oscilloscope recorded the scintillation pulse from the photomultiplier. Each scintillation material had a ten percent to ninety percent (10%-90%) of peak rise time of less than sixteen nanoseconds and a full-width-half-maximum duration of less than seventy nanoseconds. The scintillation pulse width of the selected materials was based upon literature and vendor reported measurements. Other materials are commercially available having similar fluorescent output pulse widths.

Figure 4:
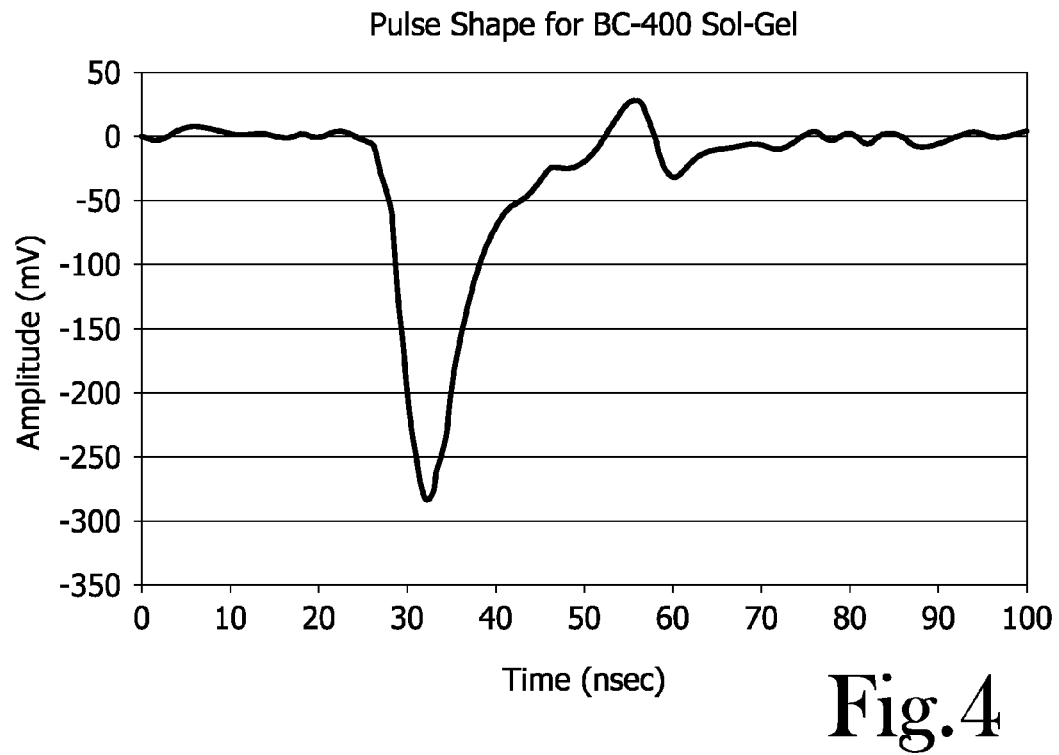
FIG. 4 illustrates the pulse shape for BC-400 sol-gel glass.
Figure 5:
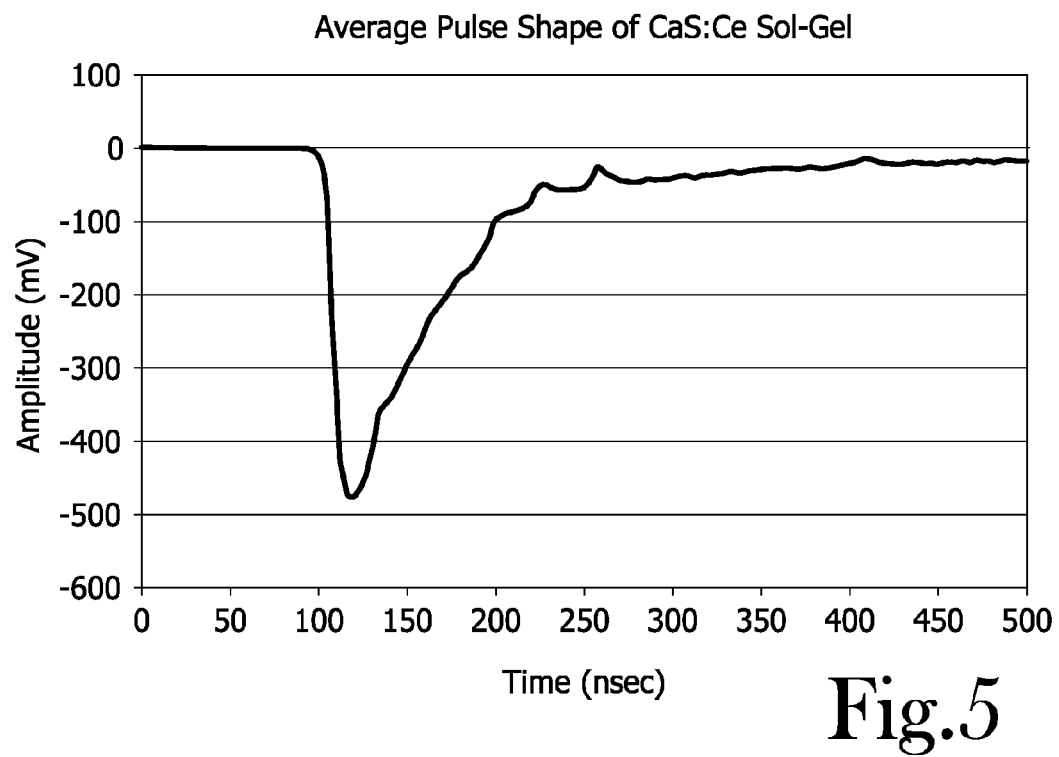
FIG. 5 illustrates the pulse shape for CaS:Ce sol-gel glass.
Figure 6:
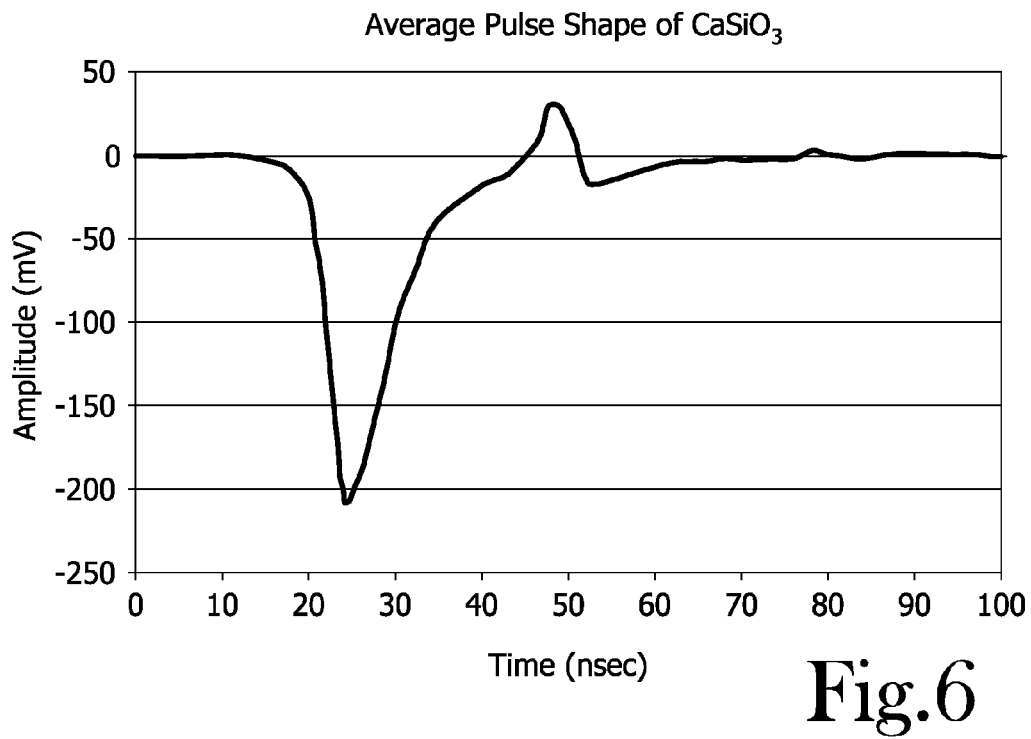
FIG. 6 illustrates the pulse shape for $CaSiO_3$:Mn,Pb sol-gel glass.
Figure 7:
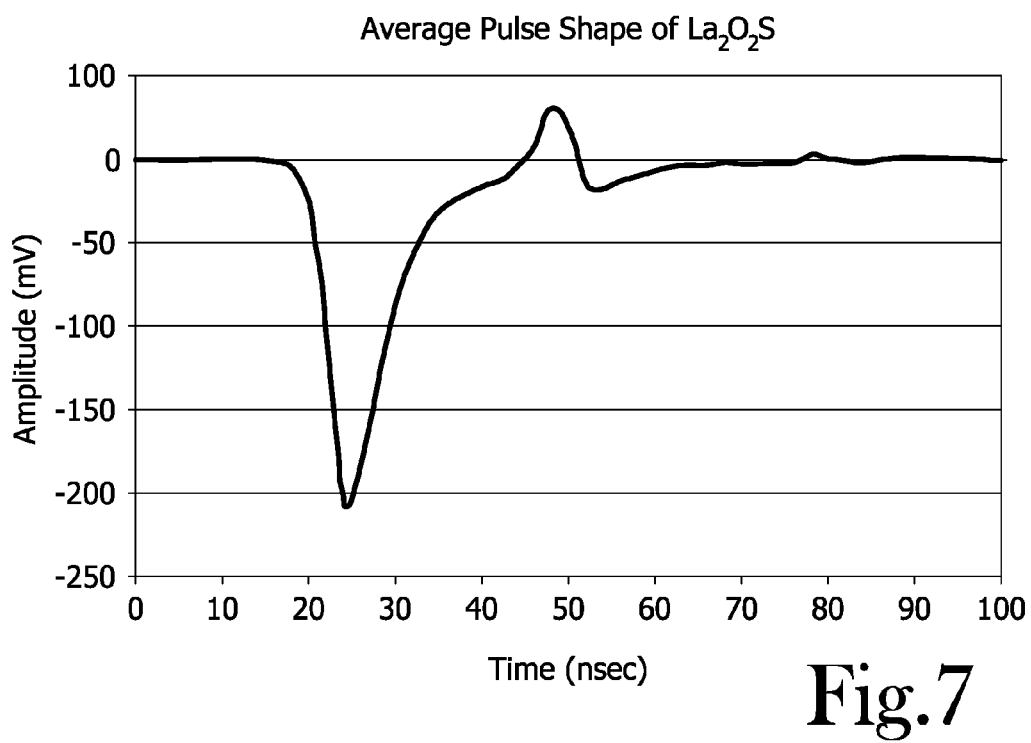
FIG. 7 illustrates the pulse shape for $La_2O_2S$:Eu sol-gel glass.
Figure 8:
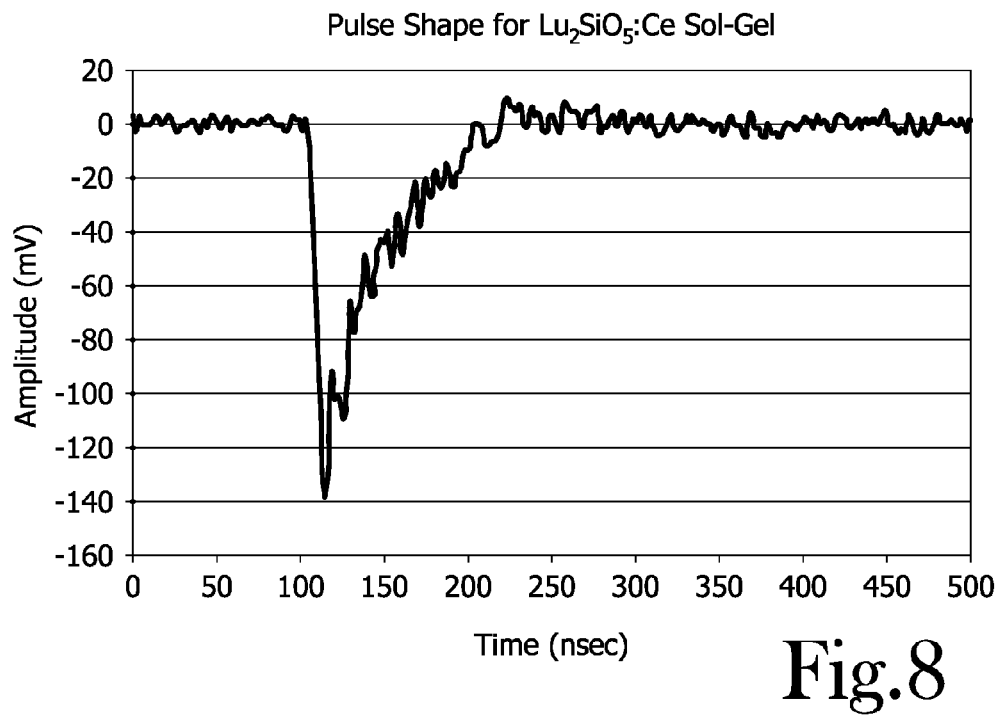
FIG. 8 illustrates the pulse shape for $Lu_2SiO_5$:Ce (furnished by CTMI, Knoxville, Tenn.) sol-gel glass.
Figure 9:
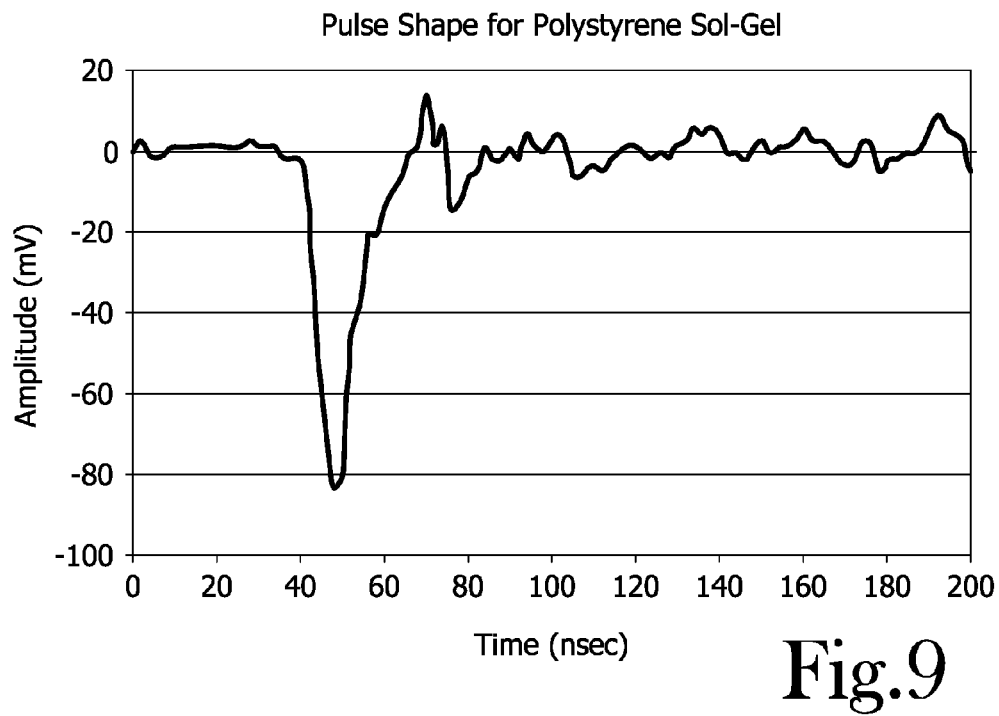
FIG. 9 illustrates the pulse shape for polystyrene-POPOP-PPO (furnished by Fermi National Laboratory) sol-gel glass.
Figure 10:
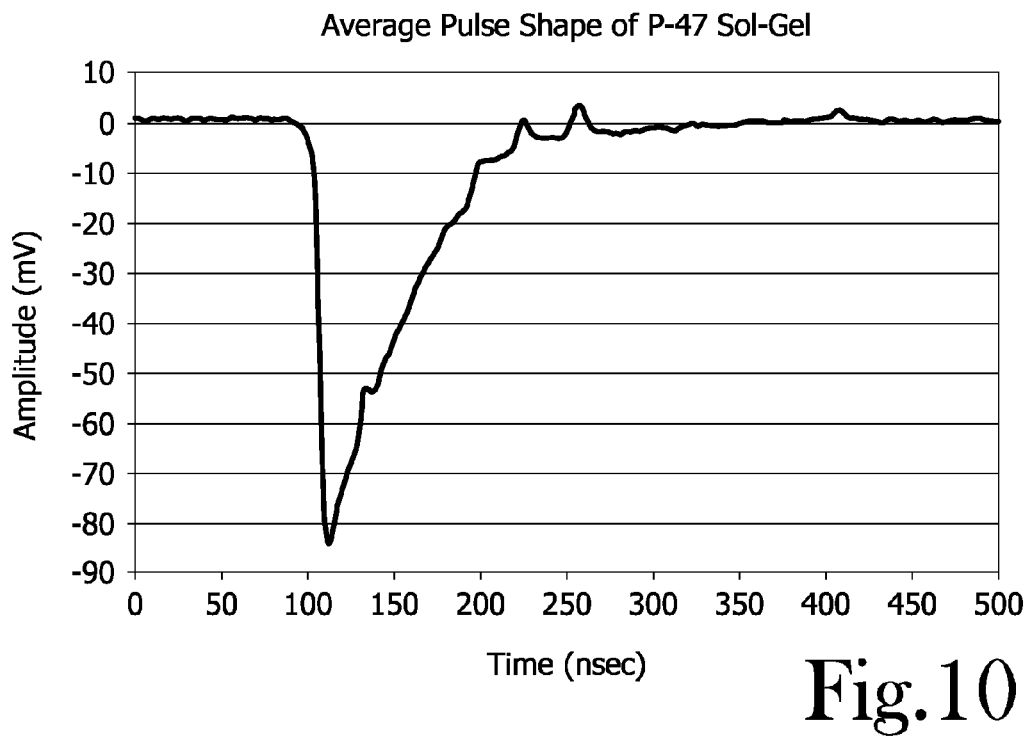
FIG. 10 illustrates the pulse shape for $Y_2SiO_5$:Ce (P-47) sol-gel glass.
Figure 11:
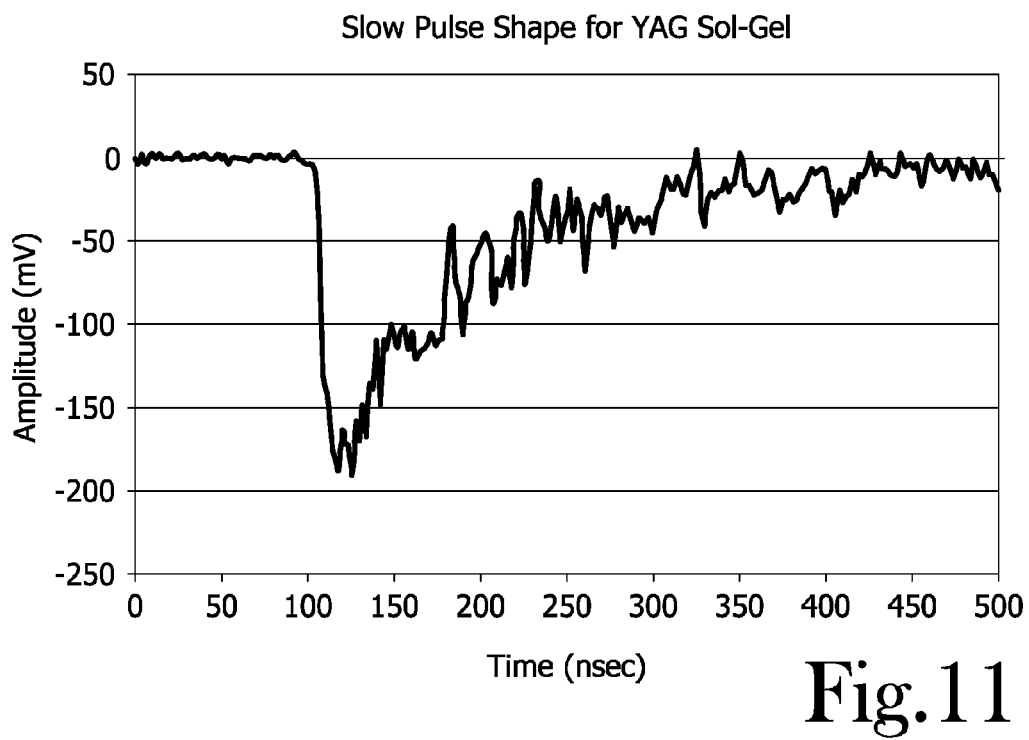
FIG. 11 illustrates the pulse shape for $Y_3Al_5O_{12}$:Ce (YAG) sol-gel glass.
Figure 12:
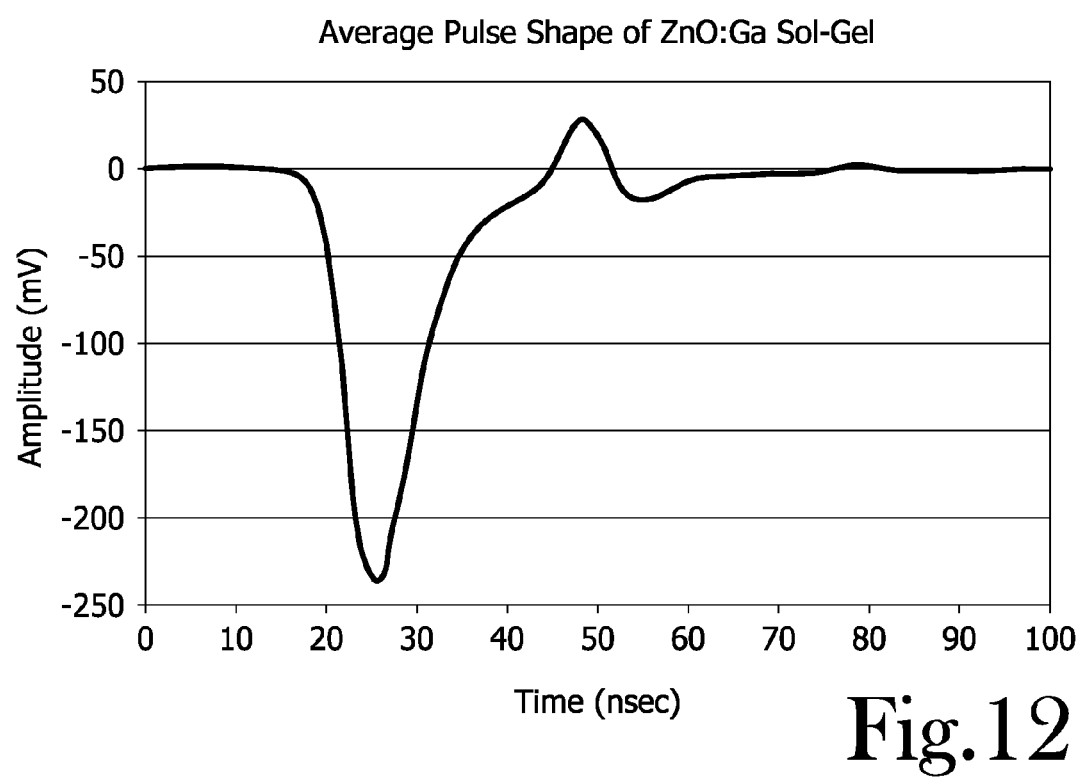
FIG. 12 illustrates the pulse shape for ZnO:Ga sol-gel glass.

FIGS. 4-12 illustrate a further reduction to practice of the present invention. Each figure illustrates the response from lithiated glass absorbing a neutron containing a selected scintillating material. Specifically, FIG. 4 illustrates the pulse shape for BC-400 sol-gel glass; FIG. 5 illustrates the pulse shape for CaS:Ce sol-gel glass; FIG. 6 illustrates the pulse shape for $CaSiO_3$:Mn,Pb sol-gel glass; FIG. 7 illustrates the pulse shape for $La_2O_2S$:Eu sol-gel glass; FIG. 8 illustrates the pulse shape for $Lu_2SiO_5$:Ce (furnished by CTMI, Knoxville, Tenn.) sol-gel glass; FIG. 9 illustrates the pulse shape for polystyrene-POPOP-PPO (furnished by Fermi National Laboratory) sol-gel glass; FIG. 10 illustrates the pulse shape for $Y_2SiO_5$:Ce (P-47) sol-gel glass; FIG. 11 illustrates the pulse shape for $Y_3Al_5O_{12}$:Ce (YAG) sol-gel glass; and FIG. 12 illustrates the pulse shape for ZnO:Ga sol-gel glass. Except as noted above, the scintillating powders are commercially available. Other inorganic compounds from the same commercial sources are available having fast—less than 100 nanosecond FWHM—scintillation pulse output and differing wavelength emission allowing selection to be made to the sensitivity of the selected detector.

The lithiated glass/scintillating particulate material is manufactured by mixing polystyrene beads with an active neutron powder. The furnace is for the high temperature fusing of the glass to the scintillating particles. After a lithiated glass/scintillating particles boule is complete, the boule is ground for the blending and fusing into the polystyrene into an extruded shape as is used in the MINOS detector. Optical wavelength shifting fiber and at least one Hamamatsu multi-anode photomultiplier tube are used. A data recorder is used for presenting the detection events.

An alternate clear plastic is polymethylmethacrylate (PMMA), which is available in solutions that can be mixed with the particulates and then allowed to evaporate. This approach can give a cost effective means of loading the neutron absorbing glass/scintillating particulates in the plastic without the expense of the higher temperature fusion of a resin.

Powdered lithiated glass/organic scintillator are mixed into polyethylene resin and is subsequently extruded into a bar stock that uses the dies, such as those developed for the MINOS neutrino oscillator detector being installed at the Fermi National Accelerator Laboratory. An in-line production process is used, where fluors are first tumbled with dry polystyrene pellets which have been held under an argon atmosphere for several days prior to extrusion. The PPO and POPOP are pre-measured into packages for addition to a set amount of polystyrene pellets during the mixing process. It is envisioned that this process is useful for the replacement of the PPO and POPOP by a finely ground powder of the lithiated glass/scintillating particles manufactured using the patented sol-gel process.

The extrusion uses the process that coats the polystyrene bar with titanium diode to maximize the coupling of the scintillation pulses to the wavelength shifting fiber. Optical fiber is coupled into the extruded groove in the block and the use of a multi-anode photomultiplier is used to operate two or more blocks of detector simultaneously.

A Cf-252 source is provided for use in testing developmental neutron detectors. A dual channel 2 Gs/sec LeCroy digital storage oscilloscope is used to record simultaneous scintillation from two neutron detecting fibers. Measurements are made with one, then the other and finally with two of the neutron detecting polystyrene slabs facing the Cf-252 source. The measurements establish the range of the neutrons by noting the passage of fast neutrons through the first polyethylene slab into the second.

Electronic processing is used to show that data can be recorded in both channels for post-processing. High speed storage of the neutron events from more than one channel is needed for coupling with data recorded concurrently from a global positioning satellite (GPS) signal. Multiple channel recording from a multi-anode photomultiplier is recordable.

After testing with ZnS:Ag and other inorganic scintillators, the key measure is the selection of the inorganic which has the best efficiency for coupling to the wavelength shifting fiber. This evaluation process is used for making samples where the one mm square fiber is coupled to the glass suspended in plastic in small bore NMR tubes.

MCNP calculations have been used for calculating the range of cold neutrons in the lithiated glass containing inorganic particles. Calculations are made to select the loading of $^6Li$ per cubic centimeter of polystyrene. Initially a loading of 2.5 milligrams of $^6Li$ per cc is used and the efficiency with energy and the absorption per one centimeter depth steps is calculated. The aerial detector models a detector of twenty five blocks of four centimeter width by one meter long. Thirty layers of one centimeter thickness is used. MCNP calculations are then compared with measurements using the Cf-252 source. The Cf-252 spontaneous fission neutrons are similar in spectral output to that from Pu-240 and the active fissioning of U-235.

Neutron detection on the boundary perimeters of nuclear reactors is the most useful non-intelligence application of the solid-state large volume neutron detector. All 103 commercial nuclear power plants in the United States have active monitoring of the radiation exposure sustained by the staff. The large neutron detectors can be incorporated into the infrastructure so that any movement of the spent nuclear fuel during the fuel reloading process can be observed in real-time. From a dispersion perspective the most vulnerable period for creating a radiological is during the period when the spent fuel in being transported. Adding the large neutron detectors would give a real-time readout of the extent of any dispersion should the spent fuel be breached. The detectors have the additional use of allowing security forces at the facility to actively and remotely verify that the operations are not deviating from an approved procedure. By observing the neutron activity using the monitors, the security forces can follow each step in the transfer of the spent fuel from removal to relocation in storage.

The security enhancement that applies to commercial reactors uses the detectors in a strictly passive role. Neutrons that are spontaneously emitted from the spent fuel are detected by the plastic detectors. Another very useful method for detecting hidden fissile material is the active interrogation method. This technique has application to the ports of entry using the large cargo containers. Several neutron detectors are placed above and along the sides of the large shipping containers. A deuterium-tritium (D-T) pulsed 14 MeV neutron source as can be purchased by M F Physics in activated while the source is moved along a rail above the container. The between pulse gaps are used to log data from all the neutron detectors. As soon as the D-T gun has made its run to the end of the trailer and returned to the home position, all the data from a nominal nine detectors are read and processed within the time it takes for the trailer to be moved out and a second trailer entered into the inspection booth, the decision is made as to whether to impound the container. All the steps described have already been demonstrated as neutron scattering from several of the elements found present in explosives and drugs have characteristic emission of MeV energy gamma rays. Large sodium iodide detectors have been used for observing the presence of the lines. Just as gamma aerial surveys can be transitioned to neutron surveys, the neutron detectors proposed for development in the submission can be transitioned easily to the interrogation of cargo shipping containers now having inspections being made for drugs.

Advanced neutron detectors are ideal for the integration as solid-state detectors in SNS [Spallation Neutron Source], for improving personnel dosimetry, and for providing non-destructive assay of equipment and nuclear fuel packages that contain fissile materials. The present invention is directed to a novel technology to synthesize highly efficient and less expensive neutron detectors via sol-gel processing, that enables the evaluation of neutron radiation fields in measurement regimes that were likely impossible with previous technology.

From the foregoing description, it will be recognized by those skilled in the art that a neutron detector composed of a matrix of scintillating particles imbedded in a lithiated glass has been disclosed. The neutron detector is provided for detecting neutrons by absorbing the neutrons in a $^6$Li isotope enriched from its natural isotopic ratio to approximately ninety-five percent (95%). The range of scintillating particles amenable to detection using the present invention is limited only by compatibility with current sol-gel methodology. Compatibility with high temperature fusion into the lithiated glass is needed for some scintillants. The present invention provides a means for manufacturing a neutron absorber/scintillating particle matrix utilizing scintillating particles having emission properties superior to ZnS(Ag). The scintillating pulse width output is less than 100 nanoseconds. Coupling of the $^6$Li to the scintillating particulates is accomplished as a homogeneous distribution of the $^6$Li within glass produced using sol-gel chemistry and into which scintillating particulates are embedded. The lithiated glass of the present invention is useful for generating a signal in the presence of gamma radiation. The material of the present invention is also useful in manufacturing a neutron detector so that a large area is observable for detecting neutrons at a relatively high resolution.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A neutron detector comprising:
   a neutron detecting material comprising a glass medium fabricated from a sol-gel precursor incorporating in a heterogeneous composition a first material that yields at least one of a triton, an alpha particle and a fission fragment when a neutron is absorbed and a second material that emits scintillations when traversed by said at least one of a triton, an alpha particle and a fission fragment, said second material being defined by small particulates such that said glass medium surrounding said small particulates is dimensioned such that charged particles emitted from the constituent within said glass medium enter said second material;
   a plastic into which particulates of said neutron detecting material are dispersed, said plastic being optically-transparent with respect to said scintillations produced by said neutron detecting material; and
   a surface coating disposed on said plastic for reflecting said scintillations within said plastic to an output of said neutron detector.

2. The neutron detector of claim 1 wherein said glass medium contains a constituent selected from the group consisting of Li-6 and B-10 that absorbs a neutron and subsequently and promptly emits a charged particle.

3. The neutron detector of claim 2 wherein said scintillating particulates are finely powdered, said scintillating particulates being mixed into a sol-gel precursor to glass, said sol-gel precursor containing a constituent of said glass medium, said scintillating particulates being locked into said glass medium as polymerization occurs.

4. The neutron detector of claim 2 wherein said scintillating particulates are overcoated by said glass medium, said scintillating particles being processed to a size in the range of from nominally five to twenty five microns in diameter referenced to spherical particulates, said range being selected to optimally absorb charged particles emitted within said glass medium.

5. The neutron detector of claim 2 wherein said scintillating particles are selecting from the group consisting of: cerium doped strontium sulfide, bismuth doped strontium sulfide, cerium activated calcium sulfide, europium activated calcium sulfide, bismuth germanate, cerium activated yttrium silicate, aluminum perovskite, cerium activated yttrium aluminum garnet, terbium activated yttrium aluminum garnet, cerium activated lutetium oxyorthosilicate, europium activated yttrium oxide, europium activated calcium fluoride, gallium activated zinc oxide, thallium-activated cesium iodide, europium activated lanthanum oxsulfide, manganese-lead activated calcium silicate, europium-activated gadolinium oxysulfide, europium activated indium borate, cerium-activated calcium sulfide, and zinc sulfide activate with silver.

6. The neutron detector of claim 5 wherein said scintillating particles are mechanically sized in the range of from five to twenty five microns, said range being selected to optimally absorb charged particles emitted within said glass medium and such that charged particles are subjected to ionization from reaction products of absorption in said glass medium.

7. The neutron detector of claim 1 wherein said transparent plastic includes a plurality of transparent plastic elements, said glass medium, said first material and said second scintillator material being dispersed in said plurality of transparent plastic elements, whereby detection of neutrons in each of said plurality of transparent plastic elements is identified individually and the occurrence of the absorption of a neutron is temporally identified with respect to a repeating fiducial timing signal thus allowing each neutron detection event in each of said plurality of transparent plastic elements to be analyzed with respect to each other.

8. The neutron detector of claim 2 wherein said glass medium defines a rigid structure and is mechanically pulverized into glass particulates in the range five to twenty five microns, such particulates being a composite of the lithiated glass and said scintillating particles.

9. The neutron detector of claim 8 wherein said glass medium comprises composite particles such that absorption of a neutron results in an ionization path yielding a light pulse characteristic of said scintillating particles.

10. The neutron detector of claim 1 wherein said transparent plastic is selected from the group consisting of at least polystyrene, polyvinyl toluene and polymethylmethacrylate.

11. The neutron detector of claim 1 wherein said surface coating contains titanium dioxide.

12. The neutron detector of claim 1 further comprising at least one wavelength shifting fiber and at least one light detecting element, said wavelength shifting fiber being secured in optical communication between said transparent plastic and said light detecting element, whereby scintillation light generated within said transparent plastic travels through said wavelength shifting fiber toward said light detecting element.

13. The neutron detector of claim 12 wherein said light detecting element is selected from the group consisting of a photomultiplier tube, a multi-anode photomultiplier, a silicon photodiode, a microchannel plate, and an avalanche photodiode.

14. The neutron detector of claim 1 wherein said transparent plastic includes a plurality of transparent plastic elements, said glass medium, said first material and said second scintillator material being dispersed in said plurality of transparent plastic elements, each of said plurality of transparent plastic elements being optically coupled to a multi-anode photomultiplier, whereby detection of neutrons in each of said plurality of transparent plastic elements is identified individually and the occurrence of the absorption of a neutron is temporally identified with respect to a repeating fiducial timing signal synchronized with a pulsing of an external neutron source thus allowing each neutron detection event in each of said plurality of transparent plastic elements to be analyzed temporally with respect to each other.

15. The neutron detector of claim 14 wherein each of said plurality of transparent plastic elements is configured to enclose a volume allowing a high probability of capture of all neutrons borne from spontaneous fission events and induced fissions events from active external injection of neutrons from a pulse neutron tube.

16. The neutron detector of claim 15 wherein neutron event data is collected and stored in a record such that correlated neutron events may be calculated to acquire a quantitative measurement of a quantity of material spontaneously emitting neutrons and a quantitative measurement of fissile content within said enclosed volume having been stimulated to emit neutrons.

17. The neutron detector of claim 16 wherein individual neutron detection events are correlated in time with neutron pulses from either of a pulsed deuterium-deuterium and a deuterium-tritium neutron tube.

* * * * *